United States Patent
Pfeifer et al.

(10) Patent No.: US 12,339,198 B2
(45) Date of Patent: Jun. 24, 2025

(54) TEST PENDULUM ARRANGEMENT FOR PERFORMING NECK CERTIFICATIONS AND METHOD FOR OPERATING A TEST PENDULUM ARRANGEMENT

(71) Applicant: ATD-LABTECH GMBH, Niedernberg (DE)

(72) Inventors: Gerhard Pfeifer, Johannesberg (DE); Christoph Szingsnis, Aschaffenburg (DE)

(73) Assignee: ATD-LabTech GmbH, Niedernberg (DE)

( * ) Notice: Subject to any disclaimer, the term of this patent is extended or adjusted under 35 U.S.C. 154(b) by 382 days.

(21) Appl. No.: 17/773,434

(22) PCT Filed: Nov. 3, 2020

(86) PCT No.: PCT/EP2020/080733
§ 371 (c)(1),
(2) Date: Apr. 29, 2022

(87) PCT Pub. No.: WO2021/089497
PCT Pub. Date: May 14, 2021

(65) Prior Publication Data
US 2022/0381642 A1  Dec. 1, 2022
US 2023/0273091 A9  Aug. 31, 2023

(30) Foreign Application Priority Data
Nov. 5, 2019 (DE) ............... 10 2019 129 721.4

(51) Int. Cl.
G01M 7/08 (2006.01)
G01M 17/007 (2006.01)
H02K 41/02 (2006.01)

(52) U.S. Cl.
CPC .......... *G01M 7/08* (2013.01); *G01M 17/0078* (2013.01); *H02K 41/02* (2013.01)

(58) Field of Classification Search
CPC ..... G01M 7/08; G01M 17/0078; H02K 41/02
(Continued)

(56) References Cited

U.S. PATENT DOCUMENTS 6,983,638 B2    1/2006   Yetukuri et al.
10,436,689 B2 * 10/2019  Pfeifer .................... G01N 3/30
(Continued)

FOREIGN PATENT DOCUMENTS

CN  2563031 Y  * 7/2003  ............ B60R 19/18
CN  106501007 A  3/2017
(Continued)

OTHER PUBLICATIONS

English-language translation of International Preliminary Report on Patentability issued in International Application No. PCT/EP2020/080733 on May 19, 2022.
(Continued)

*Primary Examiner* — Christopher P Schwartz
(74) *Attorney, Agent, or Firm* — Howard & Howard Attorneys PLLC (57) ABSTRACT

A braking device system for a test pendulum arrangement to perform crash test dummy certifications, the braking device system including a braking device configured to brake a moving pendulum, on which a head and neck assembly of a crash test dummy is capable of being arranged, in a lower braking region, wherein the braking device includes a plunger configured to be actuated axially by a motor arrangement which is designed to come into contact with the pendulum in a defined braking region and to brake the pendulum by a braking force exerted by the plunger.

20 Claims, 6 Drawing Sheets

(58) Field of Classification Search
USPC .......... 188/67, 68, 110, 134; 74/89.12–89.23
See application file for complete search history.

(56) References Cited

U.S. PATENT DOCUMENTS

| | | | |
|---|---|---|---|
| 2005/0204800 A1* | 9/2005 | Yetukuri ........... | G01M 17/0078 73/12.14 |
| 2010/0132350 A1* | 6/2010 | Hirai ................. | B64C 25/24 60/327 |
| 2013/0061653 A1* | 3/2013 | Wittmann ......... | G01M 17/0078 73/12.04 |
| 2018/0136077 A1 | 5/2018 | Pfeifer | |
| 2018/0172551 A1* | 6/2018 | Pradeep ............ | G01M 7/08 |

FOREIGN PATENT DOCUMENTS

| | | | |
|---|---|---|---|
| CN | 108918075 A | | 11/2018 |
| DE | 10109375 A1 | | 9/2002 |
| DE | 10222086 A1 | | 11/2003 |
| DE | 102015006594 A1 | | 11/2016 |
| DE | 102015006507 A1 | | 12/2016 |
| JP | 2011158407 A | * | 8/2011 |

OTHER PUBLICATIONS

English language abstract for JP 2011-158407 A extracted from espacenet.com database on Mar. 12, 2024, 1 page.

* cited by examiner

TEST PENDULUM ARRANGEMENT FOR PERFORMING NECK CERTIFICATIONS AND METHOD FOR OPERATING A TEST PENDULUM ARRANGEMENT

CROSS-REFERENCE TO RELATED APPLICATIONS

The present application is the U.S. National Phase of PCT/EP2020/080733, filed on 3 Nov. 2020, which claims priority to German Patent Application No. 10 2019 129 721.4, filed on 5 Nov. 2019, the entire contents of which are incorporated herein by reference.

BACKGROUND

Field

A braking device system for a test pendulum assembly, a test pendulum assembly for performing neck certifications, and a method for operating the test pendulum assembly are described below. The test pendulum arrangement is used to certify crash test dummies.

Related Art

Crash test dummies are used by the automotive industry to test the safety of motor vehicles with regard to occupant protection in accidents. For this purpose, various standardized crash tests are performed, e.g., frontal crashes, side crashes, rear crashes and rollover tests. The crash test dummies are placed or otherwise positioned in motor vehicles to be tested and the appropriate crash tests are performed.

The crash test dummies used have a large number of sensors in order to be able to measure the impact of the crash on the crash test dummy. In many cases, the sensors used are force sensors, displacement sensors, and acceleration sensors. During the execution of the crash test, accelerations, penetrations and forces occurring are measured and recorded by these sensors. The measurement data is then evaluated and the load verified.

The crash test dummies are designed to simulate humans in their characteristics. This refers to dimensions, mobility, weight and the like. Crash test dummies are difficult to handle because of this.

A crash test dummy must be certified regularly to ensure that it returns reliable values. The measurement chain consisting of mechanics sensors of the crash test dummies must be checked for certification. A large number of different tests are required for this purpose.

Some of the tests involve impacting a test pendulum of defined geometry, mass and center of gravity location against an aluminum honeycomb structure with the head and neck assembly mounted in extension. The pendulum has a precisely defined momentum on impact due to the known mass and the precisely defined pendulum motion. This precision is used to test the response of the head and neck assembly of the crash test dummy to the precisely determined impulse. If there is any behavior that is not within a narrow range of values, this indicates a defect in the head and neck assembly of the crash test dummy and the defective mechanical components are replaced. The certification of the crash test dummies ensures that the crash test dummy measurement system delivers correct values that can be used to carry out vehicle approval tests and enable the targeted development of appropriate restraint systems.

Common certification devices that use the test pendulums described above are designed around the test pendulum. In rooms with low ceilings, the height of the reference point is therefore ergonomically unfavorably low. In addition, several tests must be performed on the test pendulum to certify a single crash test dummy. The implementation requires a lot of experience and must be very precise. This task is time consuming, so only a small number of certifications can be completed each day. In addition, the crash test dummies are not available to perform crash tests during certification. The operation of a certification laboratory is necessary but uneconomical.

The test equipment required for the certification of crash test dummies, in particular, the pendulums to be used, have a high space requirement, as the pendulum has to be deflected over a large distance. The construction and operation of corresponding crash test dummy certification facilities are therefore associated with complications. On the one hand, rooms with sufficient dimensions must be provided, and on the other hand, the equipment must be secured against accidents during operation, especially collisions with swinging test pendulums.

For the certification of a cervical spine of a crash test dummy, the applicable standard provides that a cervical spine is fixed to a rigid pendulum together with a head and neck assembly of the crash test dummy attached to it. The pendulum is deflected upwards and accelerated from there by gravity so that the pendulum strikes against a deformable aluminum honeycomb and the existing momentum swings through the cervical spine of the head and neck assembly of the crash test dummy. Based on the swing-through of the head and neck assembly, it is possible to check whether the cervical spine of the crash test dummy meets the requirements or not. The required upward deflection of the pendulum is up to 125° with respect to a reference point located in the area of the aluminum honeycomb. According to the current standard, the reference point is 114.3 mm from the axis of rotation and center axis of the pendulum to the impact surface (mounting surface of the honeycomb). This is approximately the position that defines the compressed honeycomb. This means that deflection above the horizontal is necessary to sufficiently accelerate the head and neck assembly. On the one hand, this is costly and, on the other hand, requires structural requirements that are difficult to meet in conventional buildings.

From DE 10 2015 006 507 A1 a test pendulum arrangement for carrying out crash test dummy certifications is known, with a rigid pendulum which is arranged at a first end to be rotatable about an upper axis of rotation and which has at a second end a receptacle for a head and neck assembly of a crash test dummy, wherein at least one horizontal drive and at least one vertical drive are provided, wherein the horizontal drive and the vertical drive are provided for accelerating the pendulum.

The aluminum honeycomb against which the test pendulum strikes must be re-cut from a block for all pendulum tests required for certification and replaced before testing. The required delay pulse is influenced by the number of honeycombs, pre-compression and arrangement position and the appropriate honeycomb must be found iteratively for each test. The operation of corresponding test dispensing systems requires very experienced operators, is very time-consuming and is therefore expensive.

The task is thus to further develop test pendulum arrangements and methods for operating a test pendulum arrangement of the type mentioned above so that the corresponding test pendulum arrangements require less setup than conventional test pendulum arrangements.

SUMMARY

The object is solved by a braking device system for a test pendulum arrangement according to claim 1, a test pendulum arrangement according to the adjoining claim 7, and by a method for operating a test pendulum arrangement according to the adjoining claim 11. Further embodiments of test pendulum arrangements as well as the method for operating the test pendulum arrangement are the subject of the dependent claims.

Described is a braking device system for a test pendulum arrangement for performing crash test dummy certifications, with a braking device for braking a moving pendulum, on which a head and neck assembly of a crash test dummy can be arranged, in a lower braking region, wherein the braking device has a plunger which can be actuated axially by a motor arrangement which is designed to come into contact with the pendulum in a defined braking region and to brake the pendulum by a braking force exerted by the plunger.

Conventional test pendulum arrangements, as described at the outset, typically feature an aluminum honeycomb structure that is deformed by intrusion of the pendulum, thereby dissipating kinetic energy of the moving pendulum on which the head-and-neck assembly of the crash test dummy is located. This requires the aluminum honeycomb structure to be replaced for each individual certification. The associated setup costs and times are considerable, which reduces the number of possible test runs per time unit.

With the aid of the braking device, the braking effect of the aluminum honeycomb structure can be precisely reproduced, so that a corresponding test pendulum arrangement can be used much more frequently per unit of time than conventional test pendulum arrangements and costs for the aluminum honeycomb structure can be avoided. This can also reduce the waste generated during certification, as the aluminum honeycomb structure can only be used once at a time.

According to one embodiment, the defined braking region is the area occupied by the aluminum honeycomb structure in conventional test pendulum arrangements. In this area, the pendulum with the head and neck assembly attached to it is decelerated over a short distance, which, due to inertia, causes the neck of the head and neck assembly to swing and bend elastically. The amount of bending is standardized or defined for each dummy and must be correctly recorded by the sensors provided in the head and neck assembly. This is checked using the test pendulum assembly, the sensors are calibrated if necessary, and the head and neck assembly is certified. If the sensors give measured values outside a permissible range, this may indicate a defect and a need for repair or maintenance.

A corresponding braking device system can be retrofitted to conventional test pendulum arrangements in order to operate existing test pendulum arrangements more efficiently.

In particular, the pendulum may be a rigid pendulum comprising, for example, a tube, especially a square tube.

A head and neck assembly receptacle may be provided on the pendulum to locate the head and neck assembly. Such a head and neck assembly receptacle may be normed or standardized. The head and neck assembly receptacle can further allow the specification of different head and neck assembly types.

In a first further embodiment, a position sensor is provided for arrangement on the pendulum to determine an instantaneous position of the pendulum, wherein a controller is provided which is coupled to the position sensor and the braking device, wherein the controller is arranged to control the motor arrangement in response to signals from the position sensor.

A corresponding position sensor can be arranged in particular on an upper axis of rotation of the pendulum in order to monitor an angular position of the pendulum and transmit it to the controller. The position sensor can, in particular, be a digital position sensor, for example, an optical position sensor. Analog position sensors are also possible, which have a higher resolution, but must be calibrated regularly and place higher demands on the environmental conditions due to their noise behavior.

With the help of the position sensor and the controller, it is possible to control the motor arrangement depending on the current position of the pendulum, for example, to be able to apply the braking force in time.

For this purpose, it is necessary that the position of the plunger of the braking device is also known. This can be done with the help of a position sensor.

In a more advanced embodiment, such a position sensor may be provided by a measuring system integrated in a guide, e.g., ball rail guide. This allows synchronization of the movements of the pendulum and the plunger.

Further, in some embodiments, more advanced features are possible, such as starting the plunger in the direction of the pendulum so that the pendulum and plunger come into contact relatively smoothly to reduce noise, vibration, and shock. The latter, in particular, to increase the precision of the test procedure, as the impacts might otherwise be visible in a measuring device of the head and neck assembly. The pendulum direction is the direction in which the pendulum swings, i.e., towards the braking device.

In another further embodiment, it may be provided that the motor arrangement has at least two linear motors, wherein the plunger is fixed to a motor carriage, wherein the motor carriage is guided in the linear motors, wherein the linear motors are arranged laterally of the motor carriage.

By using two or more linear motors, it is possible to add up the forces of the linear motors and thus generate very high forces and decelerate the pendulum and the head and neck assembly over a very short distance. Linear motors are capable of providing defined force curves so that the behavior of an aluminum honeycomb structure can be reproduced with sufficient precision.

In a more advanced embodiment, it may be provided that the motor carriages are arranged on either side of the plunger.

This avoids lateral moments on the plunger caused by the drive and prevents jamming.

In another more advanced embodiment, it may be provided that four or more linear motors are provided, wherein the linear motors are arranged on either side of the plunger, wherein at least two linear motors are arranged stacked on top of each other.

This allows the linear motors to be arranged very compactly—viewed in the pendulum direction—to the left and right of the plunger and coupled with the plunger. For coupling, for example, a motor carriage can be provided on which the plunger is fixed and which is arranged so that it can move in the pendulum direction. The motor carriage is coupled to linear motors with the stacks.

In another more advanced embodiment, it may be provided that the plunger is pointed mounted and/or has a replaceable tip.

This avoids lateral forces on the motor arrangement and makes it easier to define the contact conditions between the pendulum and the plunger.

A replaceable tip allows the braking device to be easily serviced in the event of wear, which will occur mainly on the plunger.

In another more advanced embodiment, it may be provided that the braking device has a damper to prevent the plunger from punching through.

This can prevent damage to the braking device in the event of an emergency shutdown or a malfunction.

In another more advanced embodiment, it may be provided that the plunger is preloaded by a spring in the extended state.

This can provide additional operational safety for the braking device. For example, the spring may retract the plunger as far as possible during a power failure to reduce the free length of the plunger protruding from the braking device to prevent the plunger from snapping off during an uncontrolled pendulum impact.

In another more advanced embodiment, it may be provided that the braking device comprises a mounting arrangement for mounting a deformation element.

This may be useful for certain tests where an aluminum honeycomb structure is mandatory. Furthermore, the braking device can be calibrated herewith by first carrying out a test with an aluminum honeycomb structure using the same sensors and calibrating the braking device in such a way and until the sensors detect the same signal using the braking device as with the aluminum honeycomb structure.

A first independent subject matter relates to a test pendulum assembly for performing crash test dummy certifications, comprising a rigid pendulum rotatably disposed at a first end about an upper axis of rotation and having a receptacle at a second end for arranging a head and neck assembly of a crash test dummy, wherein a braking device of the type previously described is provided.

Such a test pendulum arrangement enables efficient operation with low set-up costs and times.

The pendulum can comply with the applicable standard and can, for example, be designed as a rectangular tube. Weight, length, center of gravity, and the like can also comply with the relevant standard.

However, in a more advanced embodiment, it is also possible to deviate from the specified standard of the pendulum and use an optimized pendulum instead, since the corresponding force and deceleration curves can be reproduced by the braking device independently of the characteristics of the pendulum in such a way that the applicable standards are met. This allows improved test quality to be achieved, for example, if the inertial mass and/or the vibration behavior of the test pendulum are optimized.

A head and neck assembly receptacle may be provided on the pendulum to locate the head and neck assembly. Such a head and neck assembly receptacle may be normed or standardized. The head and neck assembly receptacle can further allow the specification of different head and neck assembly types.

In a first, more advanced embodiment, it may be provided that at least one drive is provided for accelerating the pendulum from an upper starting position.

The drive can engage the upper end of the pendulum, especially the axis of rotation.

With the help of the drive, the rigid pendulum can be accelerated more than by gravity alone, which allows to shorten the time needed for the acceleration of the pendulum together with the head and neck assembly to the intended speed. Instead of a deflection of 125°, a smaller deflection can be provided, for example 90° or even less than 90°. The drive then ensures that the head and neck assembly has precisely the right speed when the braking region (reference point) is reached. The drive can also be used to raise the pendulum to the start position, enabling convenient transfer to the upper start position.

In another more advanced embodiment, it may be provided that the position sensor is arranged on a pendulum axis.

This allows a position measurement to be carried out directly on the oscillating axis, which means that a compact design of the position sensor can be achieved.

A corresponding position sensor can also be easily retrofitted in the case of a braking device system.

In another more advanced embodiment, it may be provided that a lifting device is provided for lifting the pendulum into a starting position, wherein the lifting device has a disconnectable drive so that the pendulum swings freely upon entering the braking region.

Thus, the pendulum does not have to be lifted by hand, which reduces the physical workload and speeds up the performance of certifications.

A further independent object relates to a method for operating a test pendulum arrangement of the type described above, wherein the pendulum is deflected into an upper starting position and accelerated out of the upper starting position with the aid of the at least one drive and braked by motor in the lower braking region by the braking device.

With the help of the method in question, it is possible to replace conventional test pendulum arrangements that use aluminum honeycomb structures with a more efficient method.

In another more advanced embodiment, it may be provided that the plunger is brought into an extended position and, depending on the position of the pendulum, is first accelerated in the pendulum direction and then decelerated against the pendulum direction by applying a motor force together with the pendulum.

This allows the plunger to come into contact gently with the pendulum, thus avoiding vibrations and shocks and reducing mechanical stresses on the braking device and the plunger.

In another more advanced embodiment, it may be provided that the plunger performs a travel in the pendulum direction between acceleration in the pendulum direction and deceleration against the pendulum direction.

This allows the braking device to be stabilized and prevents shocks caused by the uncontrolled impact of the pendulum on the plunger.

In another more advanced embodiment, it may be provided that the negative acceleration of the pendulum is 350 Meters/second$^2$.

Further objectives, features as well as advantageous application possibilities of the invention result from the following description of an embodiment example on the basis of the drawings. Thereby, all the features described and/or illustrated in their meaningful combination form the subject matter of the present invention, also independently of the patent claims and their back references. It is shown schematically.

BRIEF DESCRIPTION OF THE DRAWINGS

In the drawings.

Identical or similarly acting components are given the same reference numerals in the following embodiment examples for better readability.

DETAILED DESCRIPTION

Figure 1:
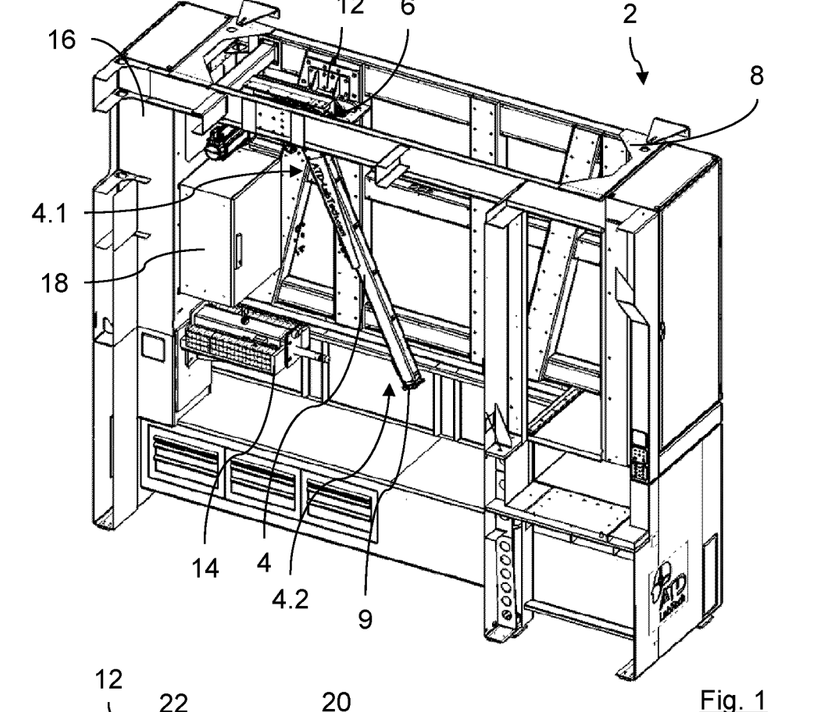
FIG. 1 shows is perspective view of a test pendulum arrangement.

FIG. 1 shows a perspective view of a test pendulum arrangement 2.

The test pendulum arrangement 2 has a pendulum 4 which is rotatably suspended from a suspension 6 at an upper end 4.1 about a center of rotation Z. The suspension 6 is arranged in a frame arrangement 8. The frame arrangement 8 allows the test pendulum arrangement 2 to be designed as a closed unit.

A receptacle 9 is provided at a lower end 4.2 of the pendulum for a head and neck assembly 10 (see FIG. 3) of a crash test dummy (not shown). The head and neck assembly 10 includes a cervical spine 10.1 and a head 10.2 secured thereto.

The pendulum 4 is in an intermediate position in the illustration according to FIG. 1.

The pendulum 4 can be moved motorically by a drive 12. In one embodiment, the actuator 12 may serve to move the pendulum 4 to an upper start position and hold it there.

After being released, the pendulum 4 can swing down freely accelerated by gravity. In another embodiment, it may be provided that the drive 12 accelerates the pendulum downward, for example, to save overall height. In this embodiment, it may be provided that the drive 12 disengages from the pendulum 4 after an active acceleration phase so that the pendulum 4 can swing freely.

A braking device 14 is provided for braking the pendulum 4, which is described in more detail in the following figures. The pendulum 4 comes into contact with the braking device 14 and is braked motorically by this.

An energy supply 16 and a controller 18 are further provided for operating the test pendulum arrangement.

Figure 2:
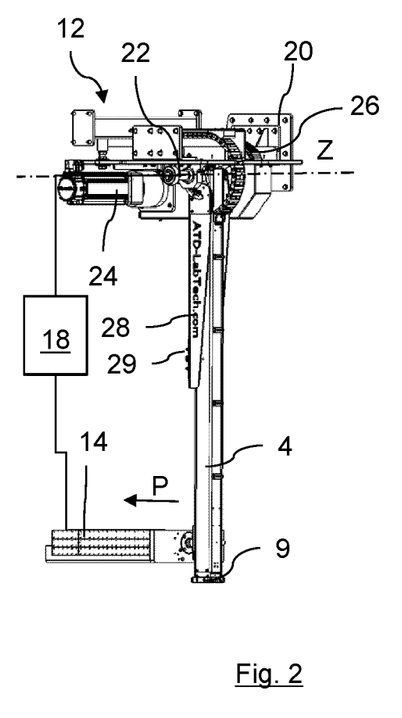
FIG. 2 shows a section of the test pendulum arrangement of FIG. 1.

FIG. 2 shows a section of the test pendulum arrangement 2 from FIG. 1, in particular, the drive section.

The pendulum 4 is arranged at its upper end to rotate about a center of rotation Z defined by a suspension 20.

A position sensor 22 is arranged on the suspension 20, which is coupled to the pendulum 4. The coupling can be direct or indirect, in particular, at an axis of the suspension 20.

In the present case, the position sensor 22 is a digital rotary encoder that detects a current angular position of the pendulum. The position sensor 22 is connected to the controller 18 and transmits data describing the respective current position of the pendulum 4 to the controller 18.

The controller 18 is also connected to the braking device 14 and controls the braking device 14 in response to the current position of the pendulum 4, as described below. The controller 18 may further take into account characteristics of the head and neck assembly 10. Thus, a child's head has different characteristics than an adult's head 10.2, which has an influence on the acceleration and thus on the impact velocity as well as energy of the pendulum 4. Even within the same dummy type, different specimens may have different physical properties within the allowable tolerances.

To raise the pendulum 4, the drive 12 has a motor 24 that moves a driver 28 via an envelope drive 26. The envelope drive 26 can be, for example, a toothed belt or a chain. The driver 28 is in contact with the pendulum 4 and can thus cause a force on the pendulum 4 against the pendulum direction P. The driver 28 is either loosely in contact with the pendulum 4 during free fall of the pendulum 4 and can move ahead of the pendulum 4 (in the pendulum direction) to simulate a free fall. The pendulum 4 can continue to swing when the pendulum 4 is braked by the braking device 14.

In the more advanced embodiment shown here, if the available headroom is too low, the driver 28 can accelerate the pendulum 4. For this purpose, the driver 28 is equipped with electromagnets 29 which can couple to the pendulum 4. The driver 28 can then actively accelerate the pendulum 4 by the motor 24. As soon as the pendulum 4 has reached the intended speed at a given point, the electromagnets 29 can be switched off and the driver 28 decoupled from the pendulum 4.

Figure 3:
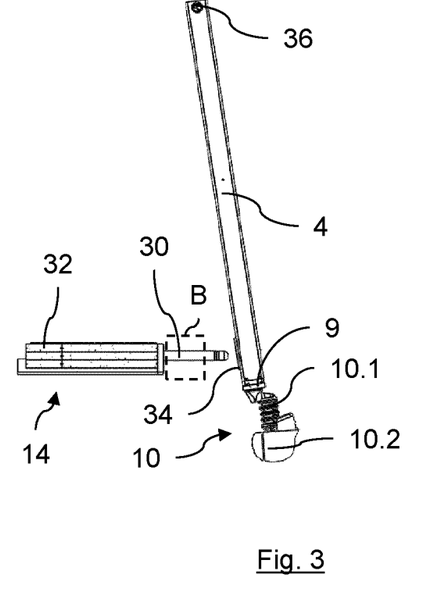
FIG. 3 shows a further section of the test pendulum arrangement from FIG. 1.
Figure 4:
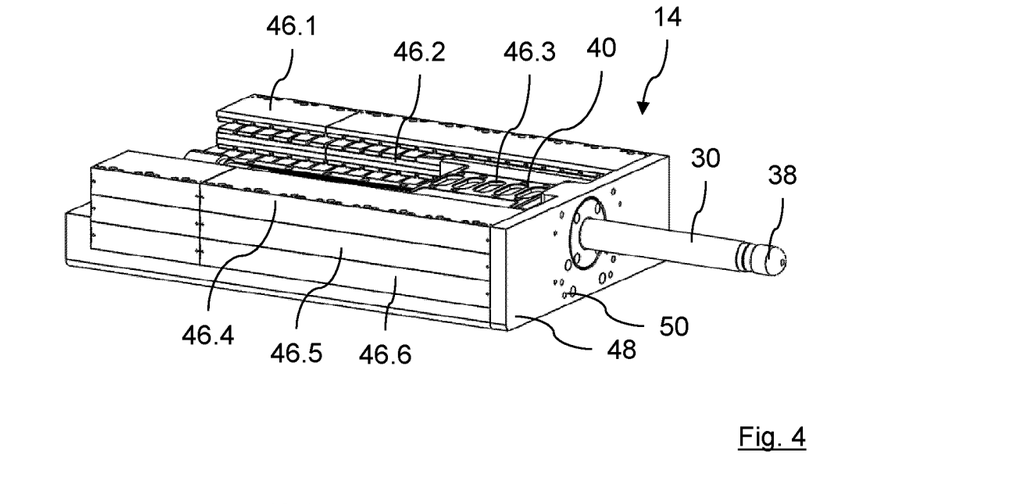
FIGS. 4-8 show a braking device of the test pendulum arrangement in various representations.
Figure 5:
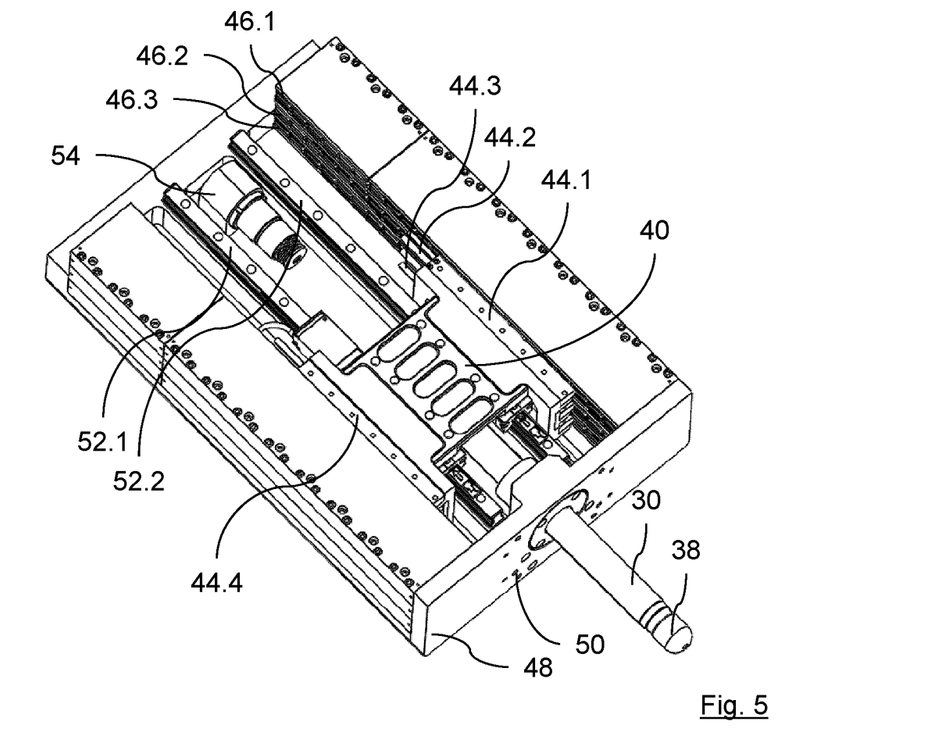
Figures 6, 7:
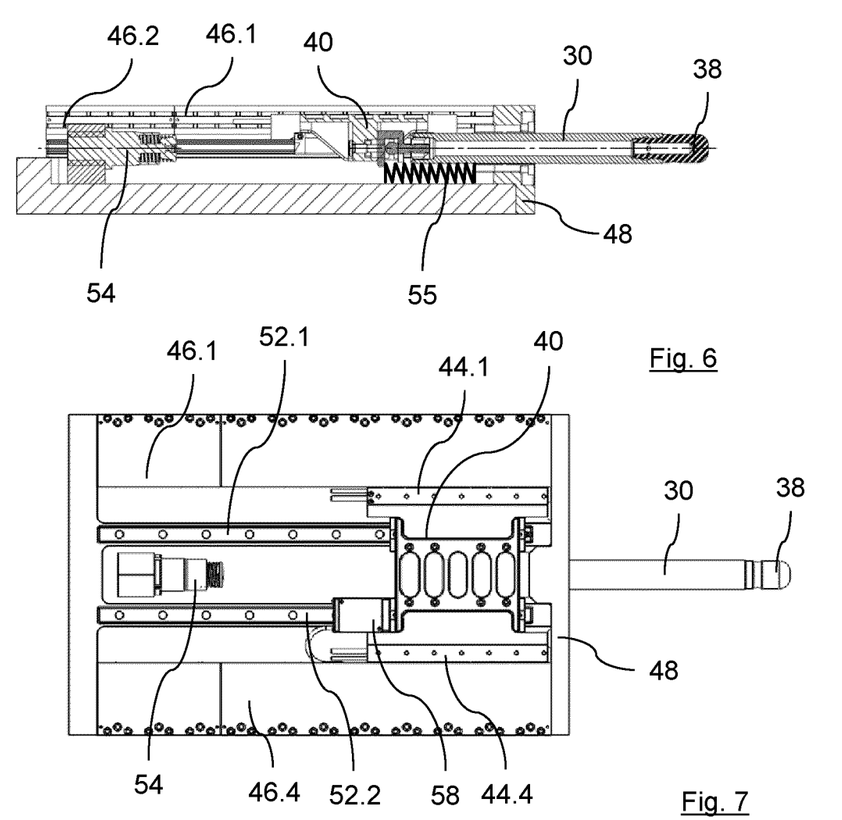
Figure 8:
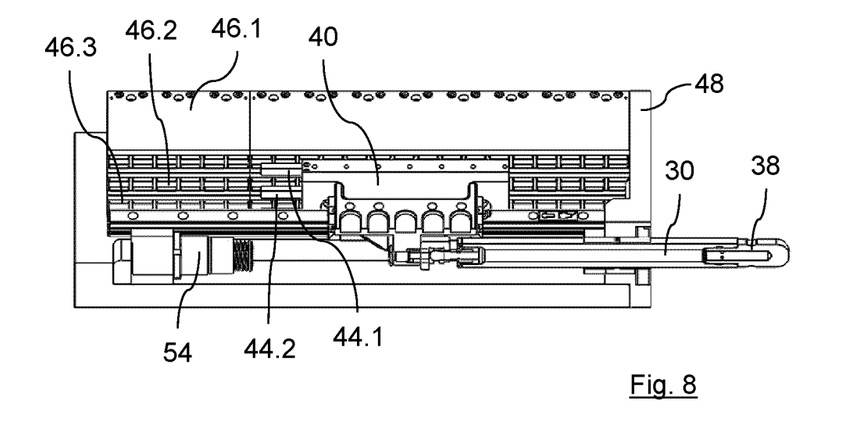

FIG. 3 shows another section of the test pendulum arrangement 2 from FIG. 1.

Attached to the receptacle 9 of the pendulum 4 is a head and neck assembly 10 to be certified, comprising a cervical spine 10.1 and a head 10.2 of a crash test dummy.

For this purpose, pendulum 4 and head and neck assembly 10 are braked in a braking region B (framed by dashed lines) defined in accordance with the applicable standard. Where an aluminum honeycomb structure is provided in conventional test pendulum arrangements, a plunger 30 of the braking device 14 performs this task in the test pendulum arrangement 4.

The braking device 14 further comprises a drive unit 32, by which the plunger 30 is actuated linearly in and against the pendulum direction P of the pendulum 4. The plunger 30 may exert a braking force on the pendulum 4 and the head and neck assembly 10 through the drive unit 32, resulting in a measurable force on the head 10.2 and cervical spine 10.1, which in turn results in a measurable deformation of the cervical spine 10.1.

A baffle plate 34 is arranged on the pendulum 4. When the pendulum 4 is deflected from above and oscillates about an axis 36 and is decelerated by the plunger 30, mechanical deformation occurs at the plunger 30 over time upon contact with the plunger 30. The plunger 30 includes a replaceable tip 38 configured as a wear part to remove wear in an inexpensive manner. Furthermore, it is possible to use different plungers for different application purposes, which may differ in terms of their geometry, materials and/or physical properties, for example, to achieve the best compromise of deceleration curve, damping properties and durability.

FIGS. 4 to 8 show the braking device 14 of the test pendulum arrangement 2 in various representations. The braking device 14 is shown without a housing.

The plunger 30 is held by a linearly guided motor carriage 40, which cooperates on both sides with three actuators 44.1-44.4, arranged one above the other, of two pairs of linear motors 46.1-46.6, each stacked on top of the other (two of the actuators are not visible in the illustrations).

The linear motors 46.1-46.6 arranged on both sides allow the generation of high forces and force curves, so that a displacement-time curve of a conventional test pendulum test on an aluminum honeycomb structure can be exactly simulated.

Fasteners 50 are provided on a front panel 48 of the braking device 14 for securing other components, such as an aluminum honeycomb structure or damping elements. In the present embodiment, the fasteners are designed as threaded holes 50.

The motor carriage 40 is guided on two rails 52.1, 52.2 in rolling bearings (ball rail guide).

The braking device 14 includes a damper 54 to prevent the motor carriage 40 from bottoming out in the event of a fault.

Furthermore, a spring 55 is arranged on the front plate 48 on the one hand and on the plunger 30 or the motor carriage on the other hand, which actively retracts the plunger into the housing of the braking device 14 in the event of a system failure.

The guide rail 52.2 is equipped with a measuring system 58 for measuring the position of the motor carriage 40. The measurement system 58 is coupled to the controller 18 so that position information regarding the plunger 30 is always available to this.

FIGS. 9A-E each show a section of the test pendulum arrangement 2 of FIG. 1 at different stages of a certification procedure of a head and neck assembly 10 of a crash test dummy.

Figure 9A:
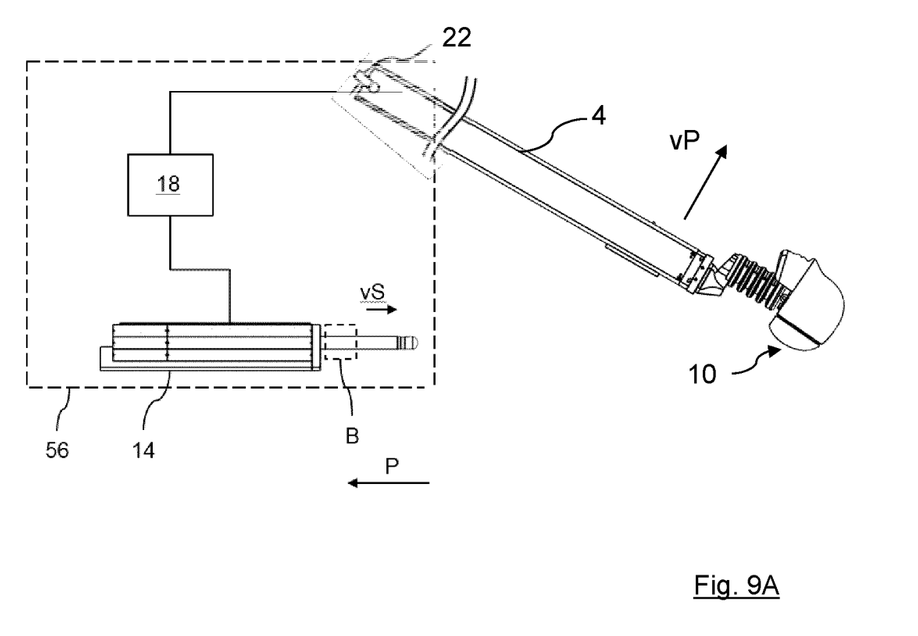
FIGS. 9A-E show a section of the test pendulum assembly of FIG. 1 at various stages of a certification run of a head and neck assembly of a crash test dummy.

In FIG. 9A, the components of a braking device system 56 are also shown schematically (framed in dashed lines). The braking device system 56 includes, but is not limited to, the braking device 14, the controller 18, and the position sensor 22. The braking device system 56 may be provided as a retrofit system for existing test pendulum arrangements.

In the phase shown in FIG. 9A, the pendulum 4 together with the head and neck assembly 10 is deflected against the pendulum direction P and brought to the start position. The position of the pendulum 4 is registered by the position sensor 22 and processed by the controller 18.

The plunger 30 is also extended beyond the braking region B against the direction of oscillation and brought into the start position (acceleration position). The position of the plunger is determined by the measuring system 58.

Figure 9B:
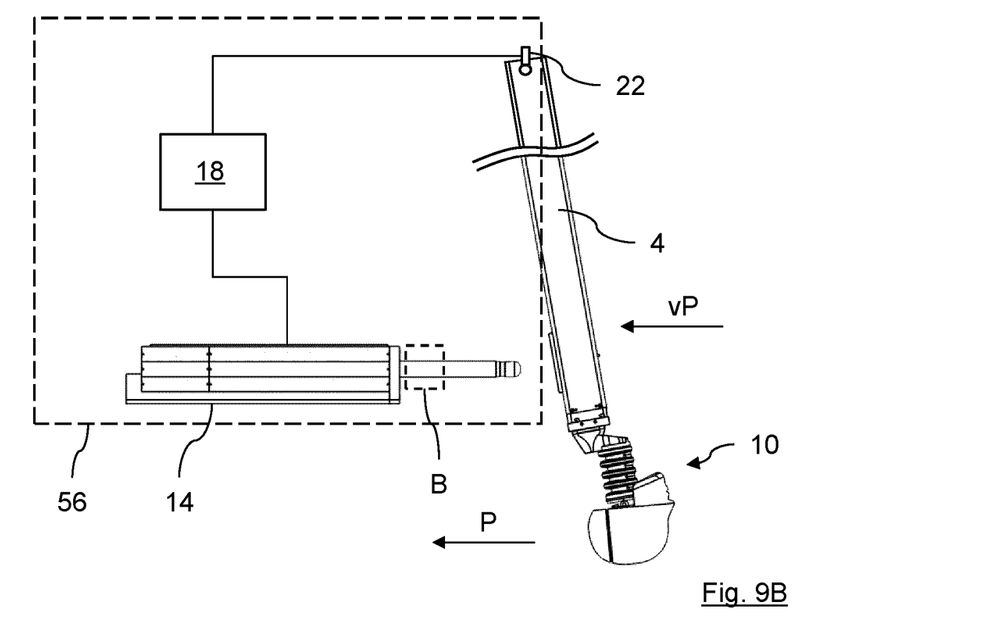

In the phase shown in FIG. 9B, the pendulum 4 is accelerated and moves in the pendulum direction toward the plunger 30. The plunger 30 is stationary at this point.

Figure 9C:
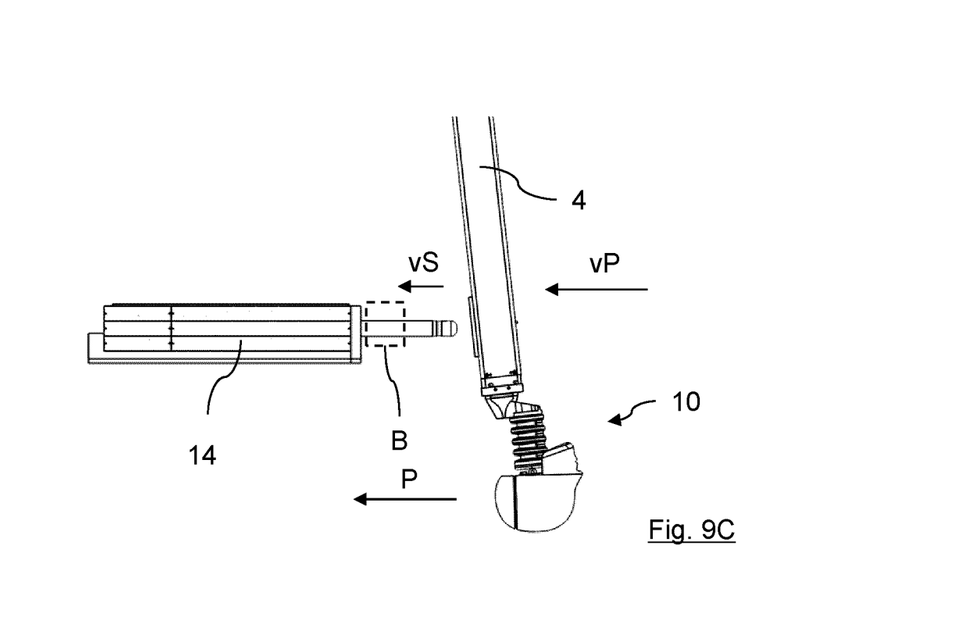

In the next phase shown in FIG. 9C, the plunger 30 has accelerated to an instantaneous velocity vS that is substantially equal to the instantaneous velocity vP of the pendulum 4, so that the pendulum 4 comes into gentle contact with the plunger 30 just before reaching the braking region B.

Figure 9D:
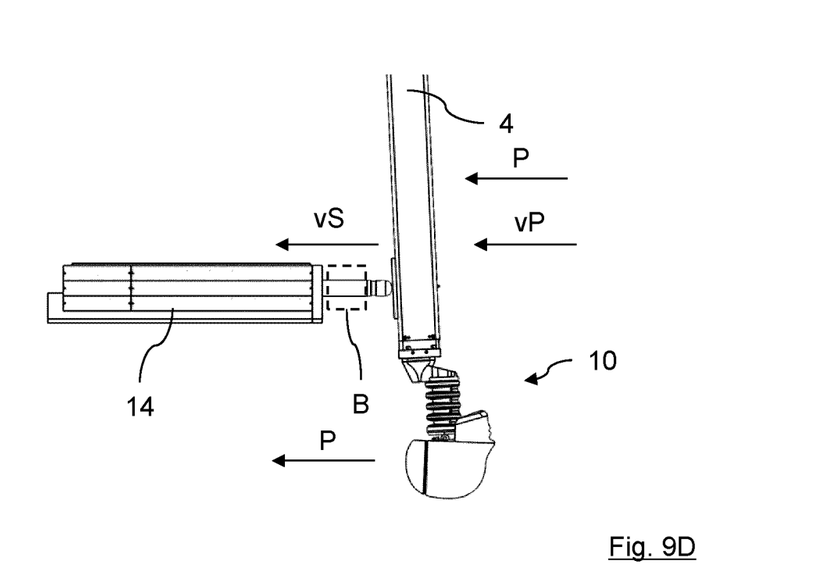

The position of the pendulum is registered by the position sensor 22, and the position of the plunger is determined by the measuring system 58 and processed by the controller 18 to achieve smooth contacting as shown in FIG. 9D.

Figure 9E:
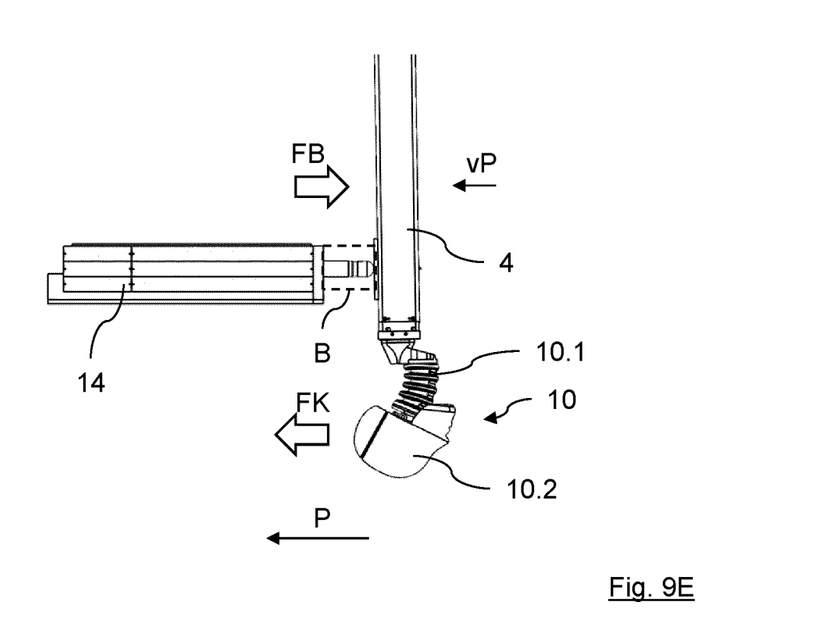

In the phase shown in FIG. 9E, the pendulum 4 and the plunger 30 are in contact and the braking device 14 exerts a braking force FB on the pendulum 4 and the head and neck assembly 10 fixed thereto via the plunger 30, causing the head 10.2 to deflect from a neutral position and the neck 10.1 to bend due to the inertial force FK acting as a result.

The braking device 14 can simulate the behavior of an aluminum honeycomb structure by use of a force and deceleration curve stored in the controller 18, so that the certification of the head and neck assembly 10 can be accurately simulated with the aid of the test pendulum arrangement 2 presented herein or the braking device system 56.

Furthermore, in some embodiments, it is possible to match the pendulum 4 and the braking device 14 to each other in order to be able to modify the pendulum 4 compared to a standard pendulum and to provide it with better properties in terms of stability and the like.

Although the invention has been further illustrated and explained in detail by example embodiments, the invention is not limited by the disclosed examples and other variations may be derived therefrom by a person skilled in the art without departing from the scope of protection of the invention. It is therefore clear that a wide range of variations exists. It is also clear that example embodiments are really only examples which are not to be understood in any way as limiting, for example, the scope of protection, the possibilities of use or the configuration of the invention. Rather, the preceding specification and the figure description enable the person skilled in the art to implement the example embodiments in a concrete manner, wherein the person skilled in the art, being aware of the disclosed inventive idea, can make a variety of changes, for example, with respect to the function or the arrangement of individual elements mentioned in an example embodiment, without leaving the scope of protection defined by the claims and their legal equivalents, such as further explanations in the specification.

LIST OF REFERENCE NUMERALS

2 Test pendulum arrangement
4 Pendulum
4.1 Upper end
4.2 Lower end
6 Suspension
8 Frame arrangement
9 Receptacle
10 Head and neck assembly
10.1 Cervical spine
10.2 Head
12 Drive
14 Braking device
16 Energy supply
18 Controller
20 Suspension
22 Position sensor
24 Motor
26 Envelope drive
28 Driver
29 Electromagnets
30 Plunger
32 Drive unit
34 Baffle plate
36 Axis
38 Tip
40 Motor carriage
44.1-44.4 Actuator
46.1-46.6 Linear motor
48 Front plate
50 Fastener
52.1, 52.2 Rail
54 Damper
55 Spring
56 Braking device system
58 Measuring system
B Braking region
FB Braking force
FK Inertia force of the head 10.1
P Pendulum direction
vP Instantaneous velocity pendulum vS Instantaneous velocity plunger
Z Center of rotation

The invention claimed is:

1. A braking device system for a test pendulum arrangement to perform crash test dummy certifications, the braking device system comprising a braking device configured to brake a moving pendulum, on which a head and neck assembly of a crash test dummy is capable of being arranged, in a lower braking region, wherein the braking device includes a plunger and a linear motor arrangement for exerting a braking force (FB) to the plunger, wherein the plunger is configured to be actuated axially by the linear motor arrangement and which is designed to come into contact with the pendulum in a defined braking region, and the linear motor arrangement brakes the pendulum as a result of exerting a braking force to the plunger.

2. The braking device system according to claim 1, wherein the plunger has a replaceable tip.

3. The braking device system according to claim 1, wherein the braking device comprises a damper configured to prevent the plunger from bottoming out.

4. The braking device system according to claim 1, wherein the braking device comprises a fastening arrangement configured to secure a deformation member.

5. The braking device system according to claim 1, further comprising a motor carriage supporting the plunger and the motor carriage cooperating with a plurality of actuators, and wherein the linear motor arrangement comprises at least two linear motors, wherein the motor carriage is guided in the linear motors by the plurality of actuators.

6. The braking device system according to claim 1, further comprising at least one rail for guiding the motor carriage.

7. A test pendulum assembly to perform crash test dummy certifications, the test pendulum assembly comprising:
a rigid pendulum which is rotatably disposed at a first end about an upper axis of rotation and has at a second end a receptacle configured to arrange a head and neck assembly of a crash test dummy; and
a braking device configured to brake the pendulum in a lower braking region, wherein the braking device includes a plunger and a linear motor arrangement for exerting a braking force (FB) to the plunger, wherein the plunger is configured to be actuated axially by the linear motor arrangement and which is designed to come into contact with the pendulum in a defined braking region, and the linear motor arrangement brakes the pendulum as a result of exerting a braking force to the plunger.

8. A method of operating a test pendulum arrangement according to claim 7, wherein the method comprises:
deflecting the pendulum into an upper starting position;
accelerating the pendulum from the upper starting position with aid of at least one drive; and
braking the pendulum by motor in the lower braking region by the braking device.

9. The method according to claim 8, wherein the method comprises:
bringing the plunger into an extended position; and
depending on the position of the pendulum, first accelerating the plunger in a pendulum direction, and then decelerating the plunger against the pendulum direction together with the pendulum by applying a motor force.

10. The method according to claim 9, wherein the plunger travels in the pendulum direction between acceleration in the pendulum direction and deceleration against the pendulum direction.

11. The test pendulum arrangement according to claim 7, wherein the test pendulum assembly comprises at least one drive configured to accelerate the pendulum from an upper starting position.

12. The test pendulum arrangement according to claim 7, wherein the test pendulum assembly comprises a position sensor is arranged on a pendulum axis of the pendulum.

13. The test pendulum arrangement according to claim 7, wherein the test pendulum assembly comprises a lifting device configured to lift the pendulum into a starting position, wherein the lifting device comprises a disconnectable drive so that the pendulum swings freely upon entering the braking region.

14. A braking device system for a test pendulum arrangement to perform crash test dummy certifications, the braking device system comprising a braking device configured to brake a moving pendulum, on which a head and neck assembly of a crash test dummy is capable of being arranged, in a lower braking region, wherein the braking device includes a plunger and a motor arrangement for exerting a braking force (FB) to the plunger, wherein the plunger is configured to be actuated axially by the motor arrangement and which is designed to come into contact with the pendulum in a defined braking region, and the motor arrangement brakes the pendulum as a result of exerting a braking force to the plunger, and
wherein the braking device system further comprises a position sensor for arrangement on the pendulum, wherein the position sensor is configured to determine an instantaneous position of the pendulum; and
a controller coupled to the position sensor and the braking device, wherein the controller is configured to control the motor arrangement in response to signals from the position sensor.

15. The braking device system according to claim 14, wherein the plunger has a replaceable tip.

16. The braking device system according to claim 14, wherein the braking device comprises a damper configured to prevent the plunger from bottoming out.

17. The braking device system according to claim 14, wherein the motor arrangement comprises at least two linear motors, wherein the plunger is fixed to a motor carriage, wherein the motor carriage is guided in the linear motors, and wherein the linear motors are arranged laterally of the motor carriage.

18. A braking device system for a test pendulum arrangement to perform crash test dummy certifications, the braking device system comprising a braking device configured to brake a moving pendulum, on which a head and neck assembly of a crash test dummy is capable of being arranged, in a lower braking region, wherein the braking device includes a plunger and a motor arrangement for exerting a braking force (FB) to the plunger, wherein the plunger is configured to be actuated axially by the motor arrangement and which is designed to come into contact with the pendulum in a defined braking region, and the motor arrangement brakes the pendulum as a result of exerting a braking force to the plunger, wherein the motor arrangement comprises at least two linear motors, wherein the plunger is fixed to a motor carriage, wherein the motor carriage is guided in the linear motors, and wherein the linear motors are arranged laterally of the motor carriage.

19. The braking device system according to claim 18, wherein the plunger has a replaceable tip.

20. The braking device system according to claim 18, wherein the braking device comprises a damper configured to prevent the plunger from bottoming out.

* * * * *